United States Patent [19]

Facchini

[11] Patent Number: 4,537,300
[45] Date of Patent: Aug. 27, 1985

[54] APPARATUS FOR SELECTING AND SUPPLYING CAPSULES OR LIKE ROUND ARTICLES OF DEFORMABLE MATERIAL TO THE FEED HOPPER OF MACHINES FOR HANDLING THESE ARTICLES

[75] Inventor: Libero Facchini, Bologna, Italy
[73] Assignee: Farmatic S.r.l., Ozzano Emilia, Italy
[21] Appl. No.: 485,169
[22] Filed: Apr. 15, 1983

[30] Foreign Application Priority Data

May 3, 1982 [IT] Italy .................. 3411 A/82

[51] Int. Cl.³ .............................................. B65G 47/12
[52] U.S. Cl. ..................... 198/453; 198/392; 198/397; 221/169
[58] Field of Search ............... 198/453, 526, 540, 542, 198/543, 549, 443, 525, 392, 393, 397; 222/236, 370; 221/167, 168, 169, 186; 133/3 C, 3 R

[56] References Cited

U.S. PATENT DOCUMENTS

| | | | |
|---|---|---|---|
| 2,863 | 11/1842 | Doane et al. | 222/370 X |
| 675,815 | 6/1901 | Clarke | 198/543 X |
| 1,235,157 | 7/1917 | Peters | 198/540 |
| 1,606,185 | 11/1926 | Ross | 221/169 |
| 2,707,576 | 5/1955 | Fowler | 221/169 |
| 2,932,377 | 4/1960 | Ashby | 221/169 |
| 3,042,183 | 7/1962 | Ackley | 221/169 |
| 3,121,435 | 2/1964 | White | 133/3 R |
| 3,196,887 | 7/1965 | White, Jr. | 133/3 R |
| 3,827,546 | 8/1974 | Pilat | 198/549 X |

FOREIGN PATENT DOCUMENTS

663493 12/1951 United Kingdom .

Primary Examiner—Joseph E. Valenza
Assistant Examiner—Jonathan D. Holmes
Attorney, Agent, or Firm—Karl F. Ross; Herbert Dubno

[57] ABSTRACT

The apparatus comprises a support base for a hopper designed to receive articles, a drum supported in a rotatable manner about a horizontal axis by the base, the interior of this drum communicating with the hopper, and an elevator having conveyor elements or pockets disposed tangentially to the rotary drum and provided at its top with a chute for discharge into the feed hopper of a device for handling these articles. The shell of this drum is provided with perforations in the manner of a sieve with countersink holes having their smallest diameter towards the exterior of the hollow drum slightly greater than the maximum diameter of the integral articles. Chute collection means for the articles selected via the countersink holes with a discharge in the vicinity of the conveyor elements or pockets of the tangential elevator are provided peripherally below the drum. The drum and the elevator are actuated with a continuous movement in the same direction.

4 Claims, 2 Drawing Figures

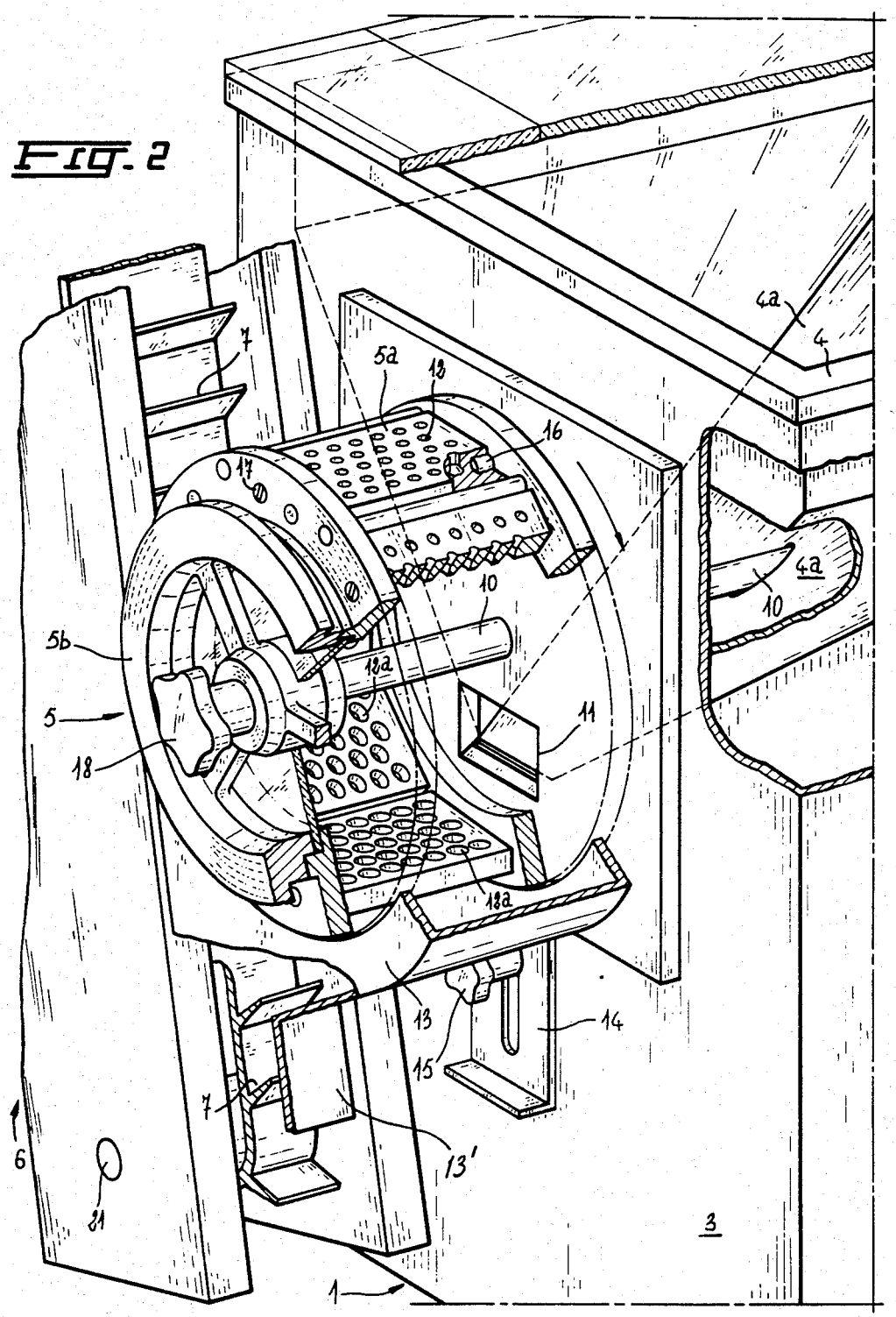

APPARATUS FOR SELECTING AND SUPPLYING CAPSULES OR LIKE ROUND ARTICLES OF DEFORMABLE MATERIAL TO THE FEED HOPPER OF MACHINES FOR HANDLING THESE ARTICLES

FIELD OF THE INVENTION

The present invention relates to an apparatus for selecting and supplying capsules or similar round articles of deformable material to a device for handling these articles.

BACKGROUND OF THE INVENTION

In the field of machines for handling capsules or similar round articles of deformable material, such as machines for filling these capsules with a particular product, for example powders of a pharmaceutical nature, and machines for packing these filled capsules or similar round articles in so-called "blister" packs, called blisters, various types of apparatus for supplying the feed hopper of these handling machines for or with capsules or articles to be handled are known.

Bearing in mind that amongst the various known types of handling machines for the above-mentioned purposes, for example amongst capsule filling machines, there is a machine which is constructed so as to comprise a single rotary turret having a continuous movement about a vertical axis and substantially constituted by a plurality of sectors each of which comprises a station for supplying empty capsules to be filled from a supply hopper disposed above into which the capsules are supplied in bulk, a station for orienting the capsules, a station for metering and charging the capsules with the product and a station for opening, closing and discharging the filled capsules from the machine, and that machines constructed in this way are in this respect very tall as a result of which they require a particular apparatus for supplying their feed hoppers with empty capsules to be filled.

OBJECTS OF THE INVENTION

The main object of the present invention is to provide an apparatus for the purposes of supplying articles to the feed hopper of these handling machines, which apparatus is also able to select these articles with respect to their structural deformation. A further object of the present invention is to provide an apparatus both in accordance with the above-mentioned object and with a construction which is particularly versatile for this use.

Lastly, a further important object of the present invention is to provide an apparatus of this type designed to carry out the above-mentioned objects in a particularly simple and efficient manner by means of an extremely simple and economic construction.

SUMMARY OF THE INVENTION

These and other objects are all achieved by means of the apparatus of the invention for selecting and supplying capsules or like round articles of deformable material to the supply hopper of machines for handling these articles, for example capsule filling machines or machines for blister packaging of the capsules, which apparatus comprises a support base for a hopper designed to receive these articles, an internally hollow drum supported in a rotary manner about a horizontal axis by the base, the interior of this drum communicating with the hopper, and an elevator or flight conveyor having conveyor elements or pockets disposed tangentially to the drum and provided at its top with a chute for discharge into the above-mentioned feed hopper of these machines, the shell of the hollow drum being perforated in the manner of a sieve with countersink holes having their smallest diameter towards the exterior of the hollow drum, slightly greater than the maximum diameter of the integral articles, trough means for collecting the articles selected via the holes being provided peripherally below the drum and adjacent point of linear travel of the said conveyor elements or pockets of the tangential elevator and means being provided for actuating the drum and the elevator with conveyor pockets with a continuous movement in the same direction.

BRIEF DESCRIPTION OF THE DRAWING

Further characteristics and advantages of the apparatus of the present invention will be shown in the following detailed description of a preferred embodiment which is given purely by way of non-limiting example with reference to the attached drawings in which:

FIG. 2 is a perspective view on an enlarged scale of part of the apparatus with certain components removed and other portions shown in cross-section in order to enable other components to be more clearly identified.

SPECIFIC DESCRIPTION

Figure 1:
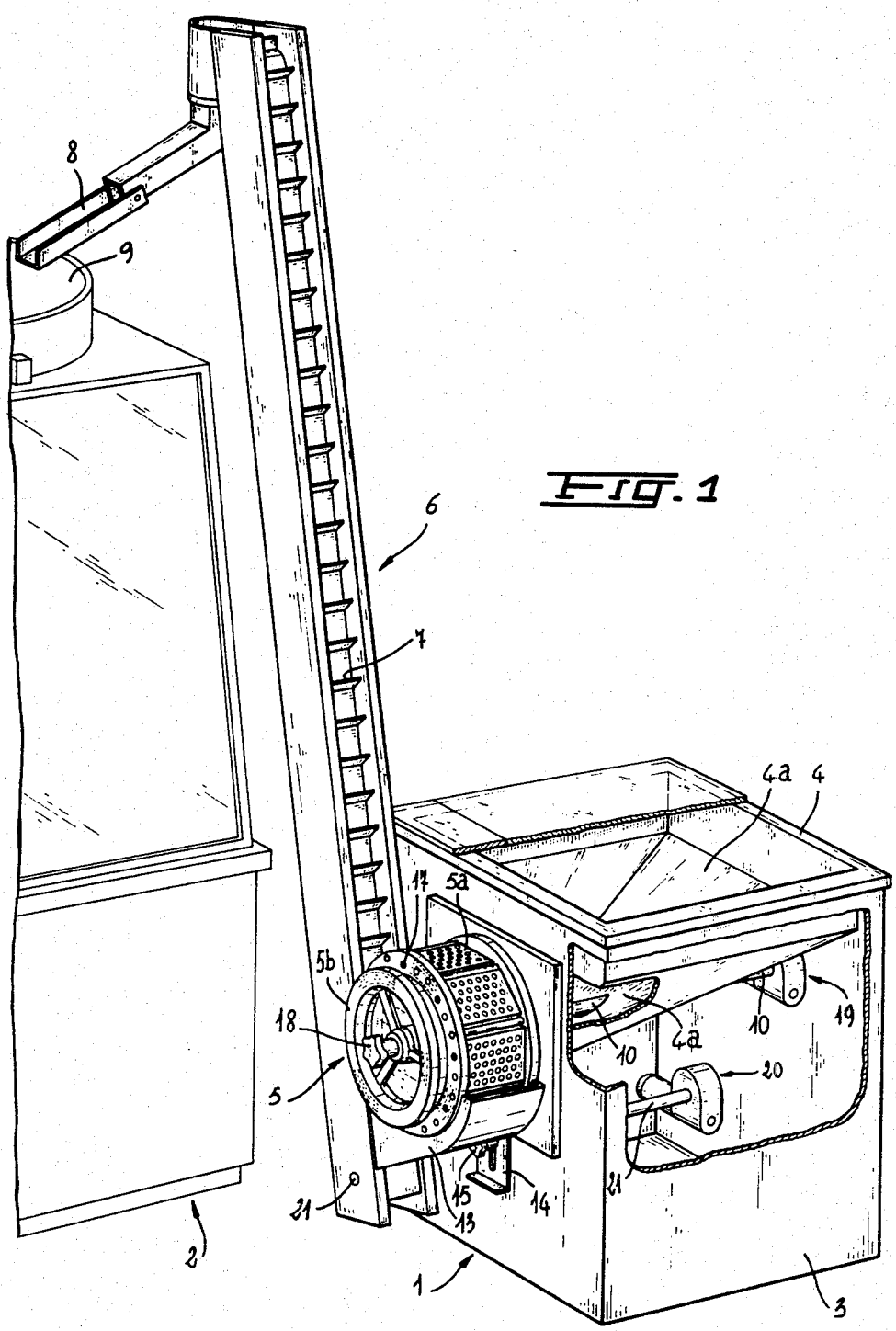
FIG. 1 is a perspective view of the apparatus in functional association with a continuous capsule filling machine.

In FIG. 1, which, as mentioned above, shows the apparatus in question in functional association with a continuous capsule filling machine, 1 indicates the apparatus overall and 2 indicates part of the continuous capsule filling machine of a known type having a single turret.

The apparatus 1 is substantially constituted by a support base 3 of a hopper 4 and an internally hollow drum 5 which rotates about a horizontal axis, and by an elevator 6 having conveyor elements or pockets 7 of a known type disposed tangentially with respect to the drum 5 and having at its summit a chute 8 for discharge into the feed hopper 9 of the said continuous capsule filling machine 2.

The internally hollow drum 5 is keyed on a horizontal shaft 10 supported in a rotary manner in any known way which is suitable by the base 3 so as to pass through an inclined wall 4a of the hopper 4 which communicates with the interior of the internally hollow, rotary drum 5 via an aperture 11 provided in the wall of the hopper 4 and the support base 3, which aperture is opposite to the inclined wall 4a of the hopper 4 and on a level with the lowest part of the included wall 4a constituting the base of the hopper 4 (see FIG. 2).

The shell of the internally hollow drum 5 is perforated in the manner of a sieve with openings 12 having their smallest diameter towards the exterior of the drum 5 and slightly greater than that of the capsules and having their bores communicating with the interior of the same drum by outwardly tapering end portions 12a. There is provided, peripherally below the drum 5 and at the front of the conveyor elements or pockets 7 of the tangential elevator 6, a trough 13 for collecting the capsules selected via the holes 12-12a and for supplying the selected capsules to the elements or pockets 7, the trough 13 formed with a downwardly extending flange 13' parallel to the conveyor (see FIG. 2).

A vertically sliding plate 14 for the manual opening and closing of the aperture 11 is provided below the trough 13. This plate 14 may be locked in the open and closed positions, or even solely in the closed position by means tightening of the screw knob 15.

The shell perforated in the manner of a sieve of the drum 5 is formed by planar segments 5a hinged on pegs 16 in alignment with one another parallel to the shaft 10, which segments may be locked in the operating position by means of a respective screw 17.

In this way access to the interior of the hollow drum 5 is possible for the removal of the defective capsules not selected via the holes 12. Access to the interior of the sieving drum 5 is also possible from the front by means of the removal of the headpiece 5b of the drum after the screw knob 18 has been acted upon, or for the removal of the drum 5 from the shaft 10 (see FIG. 2).

The continuous movement in the same direction to the sieving drum 5 and to the elevator 6 is provided in the case of the former by a speed reducing gear 19 via the shaft 10 and in the case of the latter by means of a speed reducing gear 20 via the shaft 21.

The operations of selection of the capsules or articles having an integral structure and of supply of these articles, when selected, to the feed hopper of a machine for handling articles of this type using an apparatus of this type are self-explanatory using the above description made with reference to the attached Figures.

As can be seen, the invention achieves the proposed objects and its practical embodiment may obviously include all modifications and variants covered by the protective scope set out in the following claims. In practice, the combination of the horizontal arrangement of the sieving drum with the tangential arrangement of the elevator has been found to be practically advantageous.

What is claimed is:

1. An apparatus for selecting and supplying elongate round articles of a deformable material to a device for handling said articles comprising:
    a support base;
    a hopper mounted on said base for receiving a supply of said articles;
    a hollow drum rotatable about a horizontal axis mounted on said base, said drum having a peripheral shell formed by a plurality of planar segments pivotally mounted between an endwall and an end ring of said drum for providing access to the interior thereof for the removal of unselected damaged articles, said end ring being disposed adjacent said hopper for the communication therewith of the interior of said drum;
    a plurality of openings formed in each of said segments perpendicular thereto and arranged in axial rows lying in a staggered relationship with one another, the inner ends of said openings tapering outwardly;
    an upright flight conveyor disposed tangentially to said drum and provided at the upper end thereof with a chute for discharge into said device for handling said articles;
    a trough provided beneath said drum extending along a portion of the periphery thereof for collecting the articles passed through said openings and feeding same into said conveyor; and
    means for driving said drum and said conveyor in the same direction.

2. The apparatus defined in claim 9 wherein said trough is formed with a downwardly extending flange adjacent the flights of said conveyor and parallel to the travel thereof for preventing the escape of said articles during feeding of said conveyor, said flange having a length substantially equal the distance between said flights.

3. The apparatus defined in claim 1 wherein the interior of said drum communicates with said hopper through an aperture formed in the lowest part thereof, said aperture being provided with a shutter for adjusting the opening thereof.

4. An apparatus for selecting and supplying elongate round articles of a deformable material to a device for handling said articles comprising:
    a support base;
    a hopper mounted on said base for receiving a supply of said articles;
    a rotatable hollow drum removably mounted on a horizontal shaft mounted on said base, said drum having a peripheral shell mounted between an endwall and an end ring of said drum, said end ring being disposed adjacent said hopper for the communication therewith of the interior of said drum, said endwall being held in place on said drum by a knob threaded into said shaft, said endwall being removable from said drum for providing access to the interior thereof for the removal of unselected damaged articles and for the removal of said drum from said shaft for replacement thereof by another drum having openings of another size for selecting articles of another size;
    a plurality of openings formed in the peripheral shell of said drum and arranged in axial rows lying in a staggered relationship with one another, the inner ends of said openings tapering outwardly;
    an upright flight conveyor disposed tangentially to said drum and provided at the upper end thereof with a chute for discharge into said device for handling said articles;
    a trough provided beneath said drum extending along a portion of the periphery thereof for collecting the articles passed through said openings and feeding same into said conveyor; and
    means for driving said drum and said conveyor in the same direction.

* * * * *